United States Patent [19]
Wilburn

[11] 3,933,366
[45] Jan. 20, 1976

[54] CONTAINER FOR REFUSE BAGS

[76] Inventor: William C. Wilburn, 18403 Santa Rosa, Detroit, Mich. 48221

[22] Filed: Sept. 27, 1973

[21] Appl. No.: 401,435

[52] U.S. Cl. .............. 280/47.31; 220/213; 296/101
[51] Int. Cl.² ...................... B62B 1/18; B65D 43/18
[58] Field of Search............ 280/47.26, 47.3, 47.31; 296/101; 220/32, 41, 213, 252, 345

[56] References Cited
UNITED STATES PATENTS

| | | | |
|---|---|---|---|
| 540,807 | 6/1895 | Andrews | 220/32 |
| 750,467 | 1/1904 | Kurzman | 296/101 |
| 968,828 | 8/1910 | Beckley | 296/101 |
| 1,815,244 | 7/1931 | Dodge | 280/47.26 |
| 3,623,627 | 11/1971 | Bolton | 220/41 |

*Primary Examiner*—Leo Friaglia
*Assistant Examiner*—John A. Pekar
*Attorney, Agent, or Firm*—Harness, Dickey & Pierce

[57] ABSTRACT

A wheeled container having a rectangular bottom and a semi-cylindrical cover, part of which is formed as a telescoping lid. The bottom has a low sill and upwardly extending end walls, the end opposite the wheel having a lifting handle and legs. In one embodiment the lid is guided and supported by a pair of curved tracks inside the end walls.

8 Claims, 7 Drawing Figures

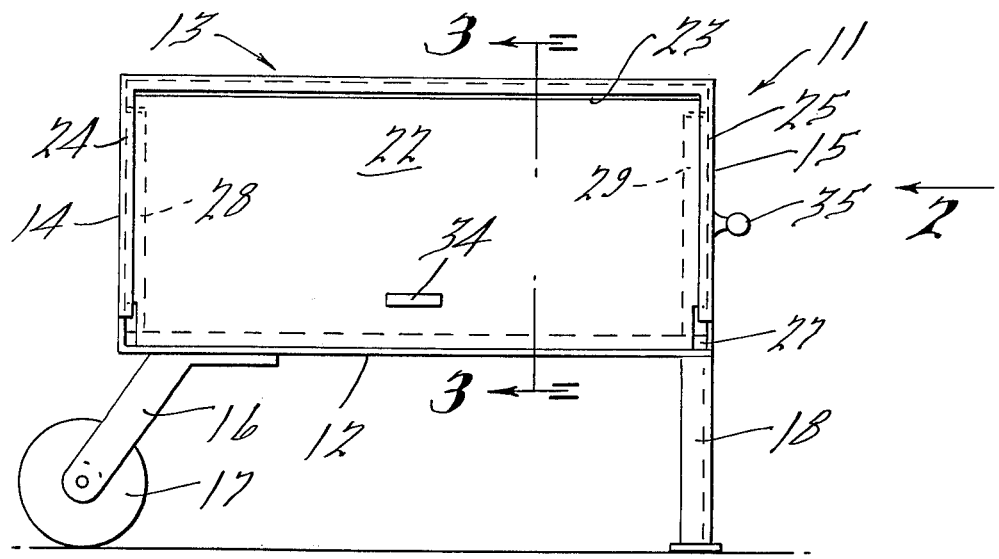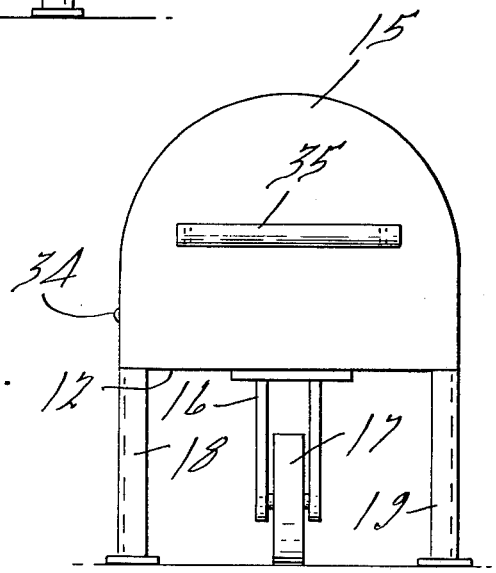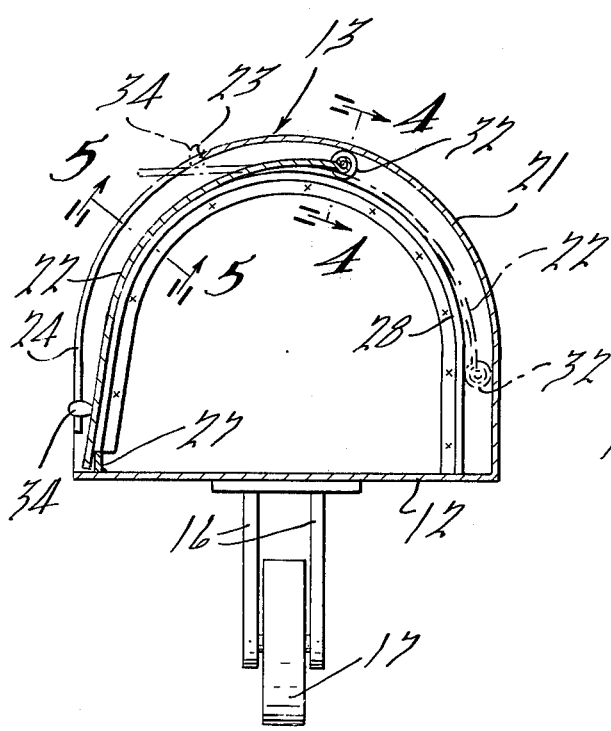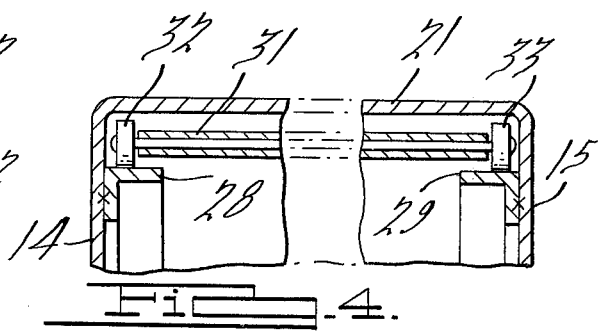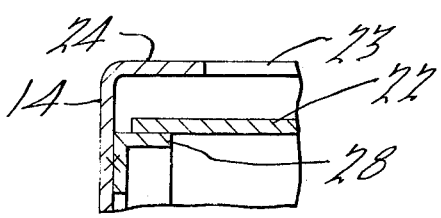

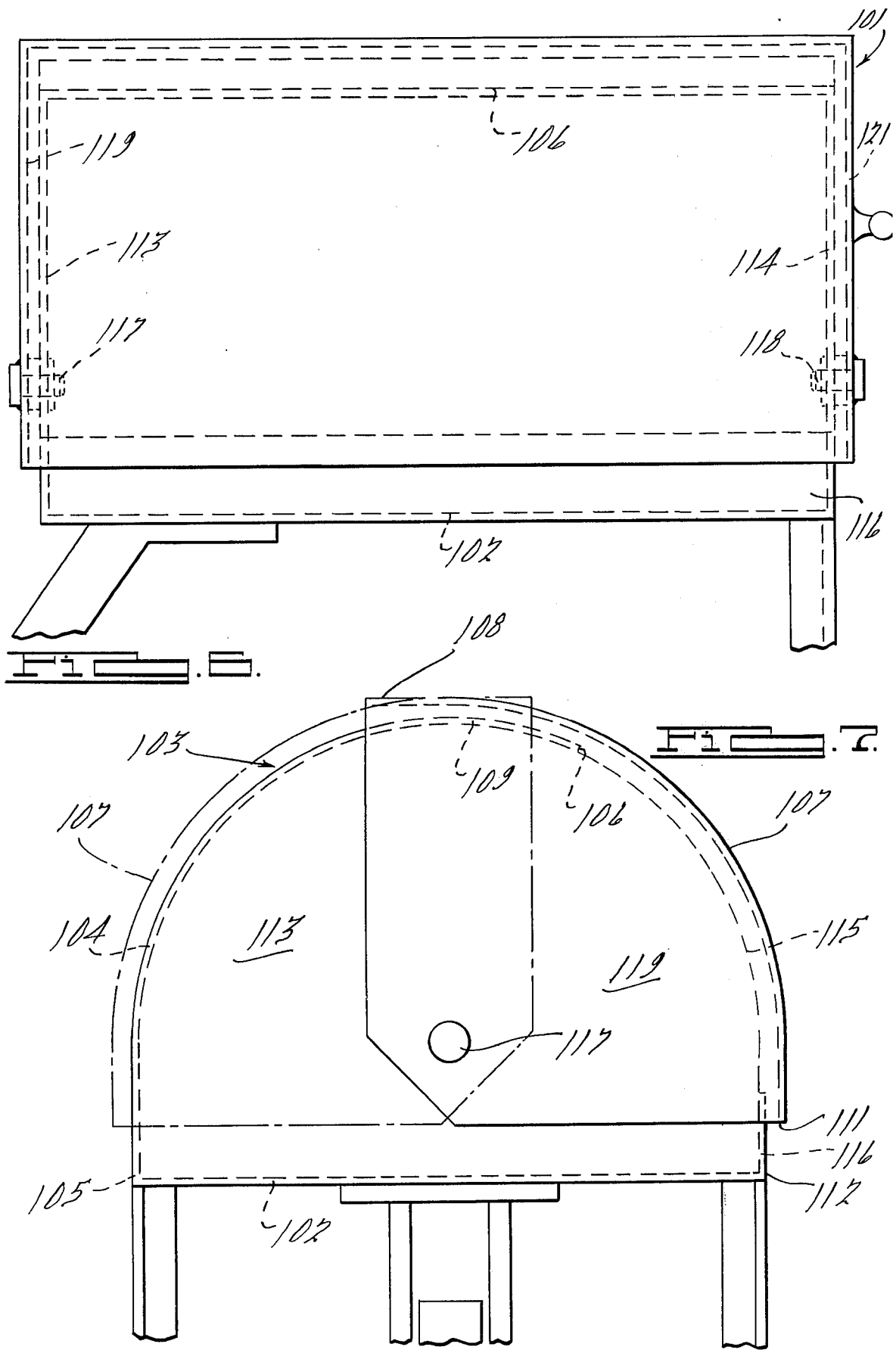

CONTAINER FOR REFUSE BAGS

BACKGROUND OF THE INVENTION

1. Field of the Invention

The invention relates to containers, especially those used for the handling of plastic or other refuse bags.

2. Description of the Prior Art

Representative of the pertinent prior art are Isaac U.S. Pat. No. 2,572,486 and Herman U.S. Pat. No. 3,218,090. Among the disadvantages of such constructions is the fact that the plastic refuse bags must be lifted a considerable distance to remove them from the container. A further drawback of these prior constructions is the fact that the lid is either entirely separable from the container and thus inconvenient to handle and subject to damage, or is secured to the container in a manner which requires additional outside clearance.

BRIEF SUMMARY OF THE INVENTION

It is an object of the present invention to provide a novel and improved container for refuse bags which obviates difficulties attendant upon prior constructions and has a lid not subject to damage and requiring no additional outside clearance.

It is another object to provide a wheeled container of this type which is easily manufactured and has a low and neat outside appearance.

It is a further object to provide an improved refuse container of this nature which can accommodate a plurality of filled plastic refuse bags and from which the bags can be easily removed with a minimum of lifting.

It is also an object to provide an improved container of this character which by its inherent construction has a high degree of rain protection.

Briefly, each illustrated embodiment of the container comprises a flat, rectangular bottom, a semi-cylindrical cover having a stationary portion extending upwardly and curved over the bottom, and a curved lid portion movable between a closed position and an open position overlapping the stationary portion, and a pair of end walls having straight lower edges and curved upper edges conforming to the cover. In one embodiment a pair of tracks are secured to the inner surfaces of said end walls for guiding and supporting the lid portion when moved between its positions.

BRIEF DESCRIPTION OF THE DRAWINGS

FIG. 1 is a side elevational view of the container shown in wheeled form.

FIG. 2 is an end elevational view taken in the direction of arrow 2 of FIG. 1.

FIG. 3 is a cross-sectional view in elevation taken along the line 3—3 of FIG. 1 and showing the lid in its closed position.

FIG. 4 is a detailed cross-sectional view taken along the line 4—4 of FIG. 3, parts being broken away and showing the guides for the lid rollers.

FIG. 5 is a fragmentary cross-sectional view taken along the line 5—5 of FIG. 3 and showing the manner in which the guides support the lid.

FIG. 6 is a front elevational view of a second embodiment of the container; and

FIG. 7 is a side cross-sectional view taken along the line 7—7 of FIG. 6.

DESCRIPTION OF THE PREFERRED EMBODIMENTS

Referring first to the embodiment of FIGS. 1 to 5, the wheeled container generally indicated at 11 comprises a rectangular bottom 12, a curved cover generally indicated at 13, and a pair of end walls 14 and 15 having straight bottoms and curved upper edges to conform to the shape of the cover. The container is shown as having a downwardly and forwardly extending fork 16 secured to the underside of the bottom at one end thereof and carrying a wheel 17. A pair of fixed legs 18 and 19 extend downwardly from opposite corners at the other end of the bottom so that the latter will be level when the legs rest on the ground.

Cover 13 comprises a stationary portion 21 and a lid portion 22, as seen in FIG. 3. Stationary portion 21 has a vertical section extending upwardly from the rear edge of bottom 12 and bending into a curved portion which partially envelopes the container. The outer edge 23 of stationary cover portion 21 is a substantial distance past the central plane of the container so that this section of the stationary cover portion has a downward slope. The height of cover 13 and the length of the container are such as to accommodate several filled plastic refuse bags of ordinary size. A pair of side flanges 24 and 25 extend from edge 23 of cover portion 21 along side walls 14 and 15 respectively, terminating at the bottoms of the end walls.

Lid portion 22 has an upper section curved similarly to the curved portion of stationary cover portion 21 and a flatter lower portion. In its closed position as shown in FIG. 3, the lower edge 26 of lid portion 22 is closely adjacent bottom 12. If desired, a short upwardly extending sill 27 may be provided along the adjacent edge of bottom 12, disposed inwardly of the lower edge of the lid portion.

The extent of lid portion 22 is such that a substantial area of its curved section underlies stationary cover portion 21, as seen in FIG. 3, thus inhibiting the entry of rain water. Means are provided for both supporting and guiding the movement of lid portion 22 between its open and closed positions. This means is in the form of a pair of flanges 28 and 29 extending inwardly from end walls 14 and 15 respectively (FIG. 4). These flanges are spaced inwardly from and extend parallel to stationary cover portion 21 and continued past edge 23 of the stationary cover portion. As they approach sill 27, these flanges are somewhat closer to the edges of end walls 14 and 15 and overlap the corners of sill 27. It will be observed in FIG. 5 that the side edges of lid portion 22 are supported along almost their entire length by flanges 28 and 29 thus adding to the sturdiness of the device.

The end 31 of lid portion 22 beneath fixed cover portion 21 supports a pair of rollers 32 and 33 which are confined between fixed cover portion 21 and guides 28 and 29 respectively, as seen in FIG. 4. A handle 34 is provided on lid portion 22 for moving it between open and closed positions. A lifting handle 35 is also secured to the outer surface of end wall 15 for wheeling the container.

In use, handle 34 will be grasped and lid portion 22 slid back under fixed cover portion 21 to approximately the dot-dash line position of FIG. 3. This will expose the interior of the container, permitting a large access area for loading with plastic refuse bags. The movement of lid portion 22 will be smooth as facilitated by guides 28 and 29 and rollers 32 and 33. After loading, lid portion 22 may be closed by again grasping handle 34 and sliding the lid downwardly. The forward portions of guides 28 and 29 will guide and support the lid which will overlap sill 27 for additional rain protection.

After one or more bags have been loaded into the container, it may be wheeled toward the pickup area by grasping and lifting handle 35. The container may either be left at the pickup site so that the refuse collectors may open the lid, remove the refuse bags and reclose the lid, or the householder may remove the refuse bags himself at the pickup point and return the container.

During time intervals between refuse pickups, empty or partially filled plastic bags may be kept in the container and additional refuse added thereto from time to time. This may be easily accomplished since there is wide access to the refuse bags when lid portion 22 is opened.

FIGS. 6 and 7 show a second embodiment of the invention which is basically similar to the first embodiment and is generally indicated at 101. The container has a bottom 102 of rectangular shape and a cover generally indicated at 103 having a fixed portion 104 extending upwardly from the rear edge 105 of the bottom and curving around over the top thereof, the upper edge 106 of the fixed portion being located past the center plane of the container. The lid portion 107 of the cover has a curved shape similar to that of the fixed cover portion and is movable between open and closed positions. In its closed position the lid portion has an upper section 108 overlapping a section 109 of the fixed cover portion and a lower edge 111 closely adjacent the forward edge 112 of the container bottom.

The container has a pair of end walls 113 and 114 having straight lower edges connected to bottom 102 and curved upper edges 115 connected to the fixed cover portion and extending forwardly and downwardly toward the forward edge of the container bottom. A sill 116 extends upwardly from the forward edge 112 of the bottom.

Lid portion 107 of the cover is pivotally connected at 117 and 118 to end walls 113 and 114 respectively. Thus, the lid portion is swingable between the closed position shown in solid lines in FIG. 7 and an open position shown in dot-dash lines. The pivots are connected to end walls 119 and 121 of lid portion 107, the end walls being of generally quadrant shape.

As in the previous embodiment, the container when in its closed position will have a substantial degree of rain protection, since the lower edge 111 of lid portion 107 overlaps sill 116 and the upper portion 108 overlaps fixed cover portion 109. In the open position of the lid portion, free access may be had to the interior of the container for the handling of refuse bags.

If desired, spring means (not shown) could be provided in either embodiment of the container for constantly urging the lid portion toward its closed position, so that refuse will not inadvertently be left exposed. Instead of the lid portion being movable by hand, it could be pedal-operated to its open position, thus enabling a user who is carrying refuse bags in both hands to place them in the container without having to put them down.

I claim:

1. A container for hand-carried refuse bags comprising a bottom of rectangular shape, a cover having a fixed portion extending upwardly from the rear edge of said bottom and curving around over the top thereof, a lid portion of the cover having end walls and having a curved shape intermediate the end walls similar to that of the fixed cover portion and movable between open and closed positions, the lid portion in its closed position having an upper section overlapping a section of the fixed cover portion and a lower edge closely adjacent the forward edge of the container bottom, whereby said refuse bags need be lifted only approximately to the level of said bottom in order to deposit them in or remove them from the container when the lid portion is open, a pair of end walls on the container having straight lower edges connected to the bottom and curved upper edges connected to the fixed cover portion and extending forwardly and downwardly toward the forward edge of said container bottom, and means connected to said end walls and guiding and supporting said lid portion during its movement between open and closed positions including pivots connecting said lid and container end walls with said pivots being located so that said end walls extend a substantial distance above said pivots, said last-mentioned means being only adjacent the end walls whereby access to said container space will be unobstructed when said lid portion is open.

2. A container for hand-carried refuse bags comprising a bottom of rectangular shape, a cover having a fixed portion extending upwardly from the rear edge of said bottom and curving around over the top thereof, a lid portion of the cover having a curved shape similar to that of the fixed cover portion and movable between open and closed positions, the lid portion in its closed position having an upper section overlapping a section of the fixed cover portion and a lower edge closely adjacent the forward edge of the container bottom, whereby said refuse bags need be lifted only approximately to the level of said bottom in order to deposit them in or remove them from the container when the lid portion is open, a pair of end walls on the container having straight lower edges connected to the bottom and curved upper edges connected to the fixed cover portion and extending forwardly and downwardly toward the forward edge of said container bottom, and means connected to said end walls and guiding and supporting said lid portion during its movement between open and closed positions, said last-mentioned means being only adjacent the end walls whereby access to said container space will be unobstructed when said lid portion is open, said means for guiding and supporting said lid portion comprising a pair of flanges extending inwardly from said end walls, said flanges being substantially parallel to said fixed cover portion and extending forwardly and downwardly from the forward edge of said container bottom, and friction-reducing means carried by said lid portion and disposed between said flanges and said fixed cover portion, said flanges being closely adjacent the edges of said lid portion along most of its extent, whereby said flanges both guide and support said lid portion during its movement.

3. The combination according to claim 2, further provided with a low sill extending upwardly from the forward edge of said container bottom, said lid portion in its closed position overlapping said sill.

4. The combination according to claim 2, the upper edge of said fixed cover portion being located past the center plane of said container.

5. A container for refuse bags comprising a bottom of rectangular shape, a cover having a fixed portion extending upwardly from the rear edge of said bottom and curving around over the top thereof, the upper edge of said fixed cover portion being located past the center plane of the container, a lid portion of the cover having a curved shape similar to that of the fixed cover portion and movable between open and closed positions, the lid portion in its closed position having an upper section underlying a section of the fixed cover portion and a lower edge closely adjacent the forward edge of the container bottom, whereby said refuse bags need be lifted only approximately to the level of said bottom in order to deposit them in the container when the lid portion is open, a pair of end walls on the container having straight lower edges connected to the bottom and curved upper edges connected to the fixed cover portion, a pair of flanges extending inwardly from said end walls, said flanges being substantially parallel to said fixed cover portion and extending forwardly and downwardly toward the forward edge of said container bottom, and friction-reducing means carried by said lid portion and disposed between said flanges and said fixed cover portion, said flanges being closely adjacent the edges of said lid portion along most of its extent, whereby said flanges both guide and support said lid portion during its movement.

6. The combination according to claim 5, said lid portion of the cover being further provided with a handle for moving it between its open and closed positions.

7. A container for refuse bags comprising a bottom of rectangular shape, a cover having a fixed portion extending upwardly from the rear edge of said bottom and curving around over the top thereof, the upper edge of said fixed cover portion being located past the center plane of the container, a lid portion of the cover having a curved shape similar to that of the fixed cover portion and movable between open and closed positions, the lid portion in its closed position having an upper section underlying a section of the fixed cover portion and a lower edge closely adjacent the forward edge of the container bottom, whereby said refuse bags need be lifted only approximately to the level of said bottom in order to deposit them in the container when the lid portion is open, a pair of end walls on the container having straight lower edges connected to the bottom and curved upper edges connected to the fixed cover portion, a pair of flanges extending inwardly from said end walls, said flanges being substantially parallel to said fixed cover portion and extending forwardly and downwardly toward the forward edge of said container bottom, friction-reducing means carried by said lid portion and disposed between said flanges and said fixed cover portion, said flanges being closely adjacent the edges of said lid portion along most of its extent, whereby said flanges both guide and support said lid portion during its movement, a wheel below the forward portion of said container bottom, a pair of fixed legs extending downwardly from the rear portion of said container bottom, and a handle on the rear end wall for lifting the rear portion of said container.

8. The combination according to claim 7, further provided with a low sill extending upwardly from the forward edge of said container bottom, said lid portion in its closed position overlapping said sill.

* * * * *